M. R. RANDALL.
NUTCRACKER.
APPLICATION FILED APR. 22, 1918.

1,357,472.

Patented Nov. 2, 1920.

Inventor
Myron R. Randall

UNITED STATES PATENT OFFICE.

MYRON R. RANDALL, OF WAUPACA, WISCONSIN.

NUTCRACKER.

1,357,472.           Specification of Letters Patent.       Patented Nov. 2, 1920.

Application filed April 22, 1918. Serial No. 230,017.

*To all whom it may concern:*

Be it known that I, MYRON R. RANDALL, a citizen of the United States, residing at Waupaca, county of Waupaca, and State of Wisconsin, have invented new and useful Improvements in Nutcrackers, of which the following is a specification.

My invention relates to improvements in nut crackers, and pertains especially to nut crackers of the type employing a lever or cam to exert bearing pressure upon the nut shell, and in which pockets or recesses are provided in opposing jaws of the mechanism for the reception of nuts of differing size and character.

One object of my invention is to provide means whereby a series of nuts of differing size may be subjected to a cracking pressure without material variation in the distance between the point where the pressure is exerted and the axis about which the movable member of the cracker oscillates.

In general, the larger nuts require a heavier pressure than the smaller nuts, although this is not an invariable rule. However, it is much easier to operate a manually actuated cracker without crushing the edible contents of the nut, or so-called meats, where the pressure is exerted in close proximity to the axis of oscillation, the movement being limited and relatively slow. Further, the degree of movement may be calculated more exactly and the movement may be more easily controlled where the length of the stroke is uniform, or substantially so, since the operator knows approximately the extent to which he must move the handle in each case after the nut has been engaged and in order to crack it without crushing the meat content.

For small nuts, such as hazel nuts and other nuts which are easily cracked, the considerations above stated are not so important, and it is therefore possible to combine, in a single tool, means for cracking nuts of differing size without varying the distance of the nut from the axis of oscillation of the movable member, and for also cracking small nuts or nuts which fracture easily by placing them between portions of the jaws which are more distant from the axis of oscillation and in which the distance may be varied in inverse proportion to the size of the nut, whereby small nuts which otherwise would be difficult to handle rapidly, if cracked in close proximity to the axis of oscillation, may be more conveniently handled and cracked at a greater distance from such axis.

With the above objects in view, I prefer to employ means for definitely limiting the downward movement of the movable member, whereby after a nut engaging movement thereof, only sufficient cracking movement will be permitted to crack the nut to an extent sufficient to enable the operator to easily remove all the nut meat contained therein. I further contemplate the provision of means whereby the upward movement of the movable member may be limited thus holding it in a raised position and preventing excessive retractive movements thereof while removing a cracked nut and inserting another in its place.

Another object of my invention is to provide means whereby the shells of nuts placed therein are cracked to an extent sufficient to permit a removal of the meat therefrom by imparting a slight rocking motion to the nut, whereby new surfaces are presented to the bearing points during the cracking operation, thus extending the fracture lines from the area where the original bearing pressure was effective to the areas which, by the movement of the nut, are successively presented to bearing pressures. In this manner, the shell is broken up without developing a crushing pressure upon the meats.

In the drawings.

Like parts are identified by the same reference characters throughout the several views.

Figure 4:
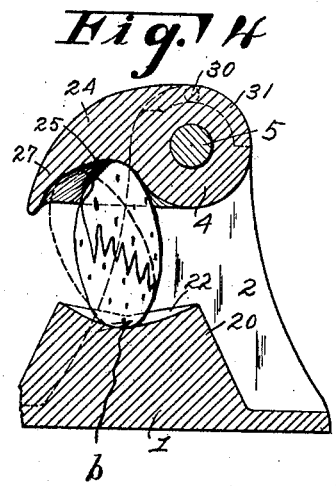
Fig. 4 is a vertical sectional view drawn on line 4—4 of Fig. 3, showing a nut in operative position in the mechanism.

A base 1 is provided with a set of raised standards 2 and 3 located at a substantial distance apart and supporting an oscillatory cam 4 between them, this cam having trunnions 5 at each end journaled in the respective standards. Near one end of the cam an operating arm or lever 7 is provided, whereby the cam may be oscillated upon its supporting trunnions. Underneath the lever 7, the base is provided with a forwardly projecting raised shelf 8 which preferably increases in height toward its front end and is provided with recesses of varying depth. The recess 9 is located a little in front of the axis of cam oscillation and is of considerable depth. The recess 10 is a continuation and is somewhat different in contour, the walls being tapered more nearly to a point at the bottom, this recess being adapted to receive long narrow nuts such, for example, as pecan nuts. The forward portion of the shelf 8 is provided with recesses 11 and 12 of less depth, the recess 12 being a small recess designed to receive hazel nuts, etc.

The under surface of the lever 7 is provided with corresponding recesses 13, 14, 15, and 16, opposing the recesses 9, 10, 11, and 12 respectively, whereby nuts placed in the shelf recesses may also be engaged at their upper ends or sides in the corresponding lever recesses for cracking operations. The intervening portions of the shelf and lever serve as stops whereby the downward movement of the lever is limited and the form and depth of the recesses is such that, when nuts of the proper size are placed therein, the shells will be cracked sufficiently to permit a removal of the meats without crushing the meats, since the lever will be in contact with the shelf before the meats are crushed.

The recesses 10, 11, and 12 are designed more particularly to receive nuts having thin or easily broken shells and also to receive nuts which are closely graded as to size. Where the nuts are graded and the shells fragile, the cracking operation is a simple one and may be rapidly carried on by placing the nuts in these recesses. But for the harder and tougher shells, and for ungraded nuts, a different arrangement is desirable and this will now be described.

Figure 1:
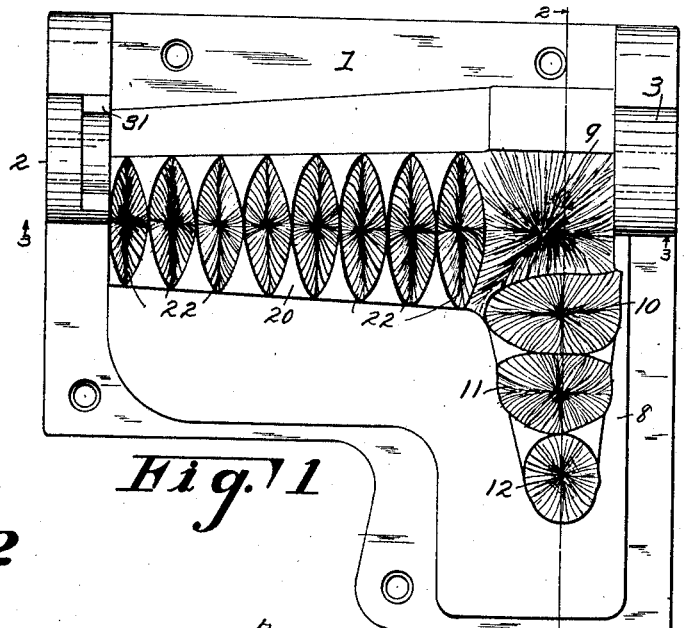
Figure 1 is a plan view of a nut cracker base embodying my invention, but showing the movable member or lever removed.
Figure 2:
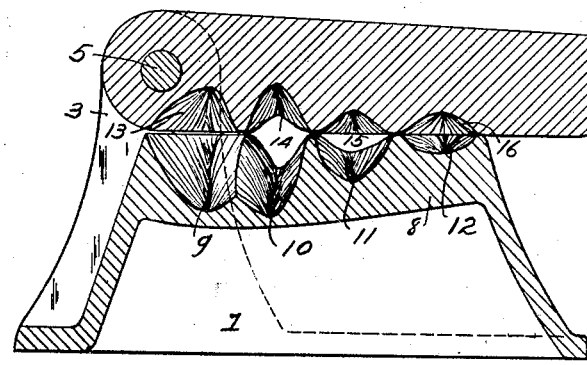
Fig. 2 is a vertical sectional view drawn on line 2—2 of Fig. 1, showing the lever or cam in cross-section on the same plane.
Figure 5:
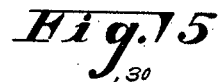
Fig. 5 is a vertical sectional view drawn on line 5—5 of Fig. 3, with a portion of the cam broken away to show the means for limiting upward movement of said lever.
Figure 3:
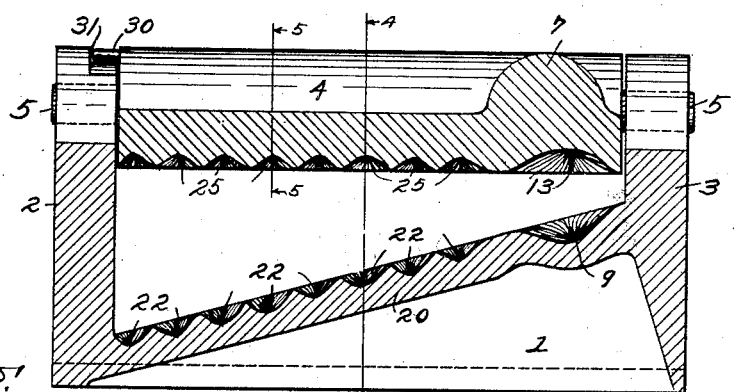
Fig. 3 is a vertical sectional view drawn on line 3—3 of Fig. 1 and also showing the lever in its lowered position.

It will be observed in Figs. 1 and 3 that the base is provided with a laterally extending portion 20 between the standards 2 and 3, this portion being inclined from the side occupied by the standard 3 toward the side occupied by the standard 2 and provided with a series of recesses 22 located in a vertical plane parallel with, and a short distance in front of, the axis of cam oscillation, the recess 9 being preferably located in the same plane. The cam 4 is provided with a portion 24 which overhangs this series of recesses and is provided with a corresponding series of recesses 25. The portion 24 of the cam is arched on the under side, and in front of the recesses, this under surface is flat and downwardly inclined from the arched portion, forming a marginal overhanging lip 27. From the inner side of this lip the recesses 25 extend in the arched under surface of the portion 24 toward the axis of cam oscillation, and progressively deepen to a point substantially midway of their length. The recesses are generally oval in outline as is the case also with the recesses 22 in the base, as clearly shown in Fig. 1. These latter recesses also progressively deepen from each end toward the central portions thereof, the deepest point being the point $b$ in Fig. 4.

When cracking nuts by means of the cam 4, the handle or lever will be raised sufficiently to allow the nut to be inserted between it and the portion 20 of the base. The nut may be inserted from the front and near the standard 2 where the cam is most widely separated from the base, after which, the nut may be moved to the right, $i.\ e.$, in the direction of the standard 3 and entered in that recess 22 which is adapted to support the nut in such relation to the cam that, when the lever is depressed into contact with the stop shelf 8, a cracking pressure will be developed with minimum crushing tendency. Thereupon the lever will be moved downwardly and the upper end of the nut will be engaged in the opposing recess 25 of the cam. The nut will preferably be so held by the operator that its upper end will first be engaged at the front end of the recess 25 adjacent to the lip 27, whereupon the downward movement of the lever will cause the cam to exert pressure upon the upper end of the nut and simultaneously shift it backwardly in the recess toward the deepest portion thereof, the nut moving with a rocking motion upon the point $b$ indicated in Fig. 4. Owing to the fact that the upper end of the nut thus becomes engaged in the deepest part of the recess 25 indicated at $a$ in Fig. 4, which point is located only a short distance in front of the axis of cam oscillation, and somewhat below said axis, it is obvious that a continued motion of the cam will thereupon continue the rocking motion of the nut during the cracking operation, the upper end of the nut being pushed downwardly in the arc of a circle of which the axis of cam oscillation is the center. This downward and lateral pressure upon the upper end of the nut, whereby it continuously tends to oscillate over the point $b$, will be found extremely effective in extending the lines of fracture in the shell and in multiplying the lines of fracture in such a manner as to allow the contents to be readily disengaged.

As the nut begins to crack, there is a shortening of the distance between the upper and lower points of the nut, thereby permitting a further rotation of the upper member. This further rotation of the upper member carries the upper point of the nut inwardly toward the axis of rotation and thereby applies stresses along the different lines greatly increasing the efficiency of the cracking operation. It is also to be noted that there is a sliding motion of the upper end of the nut relatively to the upper member during a portion of the rocking motion.

Owing to the fact that the recesses 22 in the base and the recesses 25 in the cam are all located at the same distance in front of a vertical plane which includes the axis of cam oscillation, it is obvious that the operator will quickly become expert in placing the nuts in the appropriate recesses, whereby substantially the exact amount of pressure necessary for cracking the shells without breaking the meats will be developed in each instance. Very rapid operation of the device upon successive nuts becomes possible, and it is also possible, if desired, to insert a plurality of nuts of differing sizes for a simultaneous cracking operation.

I preferably provide the cam with a stop projection 30 at one or both ends which moves in a segmental recess 31 formed in the adjacent standard, the rear end of the recess being adapted to engage the stop and limit the movement of the lever. The arrangement is preferably such as to allow the lever to swing upwardly to a point a little beyond a direct vertical position, whereby the lever, when thus raised, will tend to remain in the raised position.

I claim:—

1. A nut cracker having a base provided with elongated pockets deepened in their center, a cam pivoted above the base and also having pockets in its lower face associated with the pockets in the base and offset from the axis of the cam in a plane common to the working face of the cam, and means on the cam for effecting contact with the nut and forcing it backwardly in the pocket with a rocking movement to present new portions of the nut's shell to cracking pressures.

2. A nut cracker provided with a base having a series of oval nut receiving pockets, a cam pivoted above the base in a position with its axis of oscillation substantially in the same vertical plane with the rear portion of the base pockets, a member extending forwardly on the cam and having an arched lower face extending forwardly from near the vertical plane including the axis of oscillation and adapted to register with nuts placed in the oval pockets and force them rearwardly therein and also into the crown of the arch, with an oscillatory movement.

3. A nut cracker having both forwardly and laterally projecting shelves on its base, recesses in the shelves adapted for the reception of nuts of different size, and a cam pivoted above the base and adapted for movement into nut cracking relation to the pockets formed in the shelves.

4. A nut cracker including the combination of a base, a cam adapted for oscillation above the base, means for limiting downward oscillation of the cam, an inclined shelf on the base parallel with the cam and adapted to retain nuts of differing size with their upper ends substantially at a common level, another shelf placed at right angles to the first mentioned shelf and having pockets of a size inversely proportioned to their distance from the axis of cam oscillation, said cam being adapted to crack nuts correctly placed in the recesses to substantially an equal extent.

In testimony whereof I affix my signature in the presence of two witnesses.

MYRON R. RANDALL.

Witnesses:
JAMES JENSEN,
R. E. MATHER.